(12) United States Patent
Wang et al.

(10) Patent No.: US 8,406,532 B2
(45) Date of Patent: Mar. 26, 2013

(54) IMAGE MATCHING USING LINE SIGNATURE

(75) Inventors: Lu Wang, Los Angeles, CA (US); Ulrich Neumann, Manhattan Beach, CA (US); Suya You, Aracida, CA (US)

(73) Assignee: Chevron U.S.A., Inc., San Ramon, CA (US)

( * ) Notice: Subject to any disclaimer, the term of this patent is extended or adjusted under 35 U.S.C. 154(b) by 952 days.

(21) Appl. No.: 12/486,506

(22) Filed: Jun. 17, 2009

(65) Prior Publication Data

US 2010/0322522 A1 Dec. 23, 2010

(51) Int. Cl.
*G06K 9/62* (2006.01)
*G06K 9/36* (2006.01)
(52) U.S. Cl. ............ 382/209; 382/225; 382/276
(58) Field of Classification Search .......... 382/119, 382/181, 187–189, 209, 218, 225
See application file for complete search history.

(56) References Cited

U.S. PATENT DOCUMENTS

| 5,537,489 | A | * | 7/1996 | Sinden et al. ............... 382/187 |
| 7,869,634 | B2 | * | 1/2011 | McOwan et al. ............ 382/119 |
| 2004/0240562 | A1 | * | 12/2004 | Bargeron et al. ............ 375/240.29 |

OTHER PUBLICATIONS

Ansari et al., On Detecting Dominant Points, Pattern Recognition, 1991, vol. 24 No. 5, pp. 441-451.
Baumberg, Reliable Feature Matching Across Widely Separated Views, CVPR, 2000, pp. 774-781.
Bay et al., Wide-Baseline Stereo Matching with Line Segments, CVPR, 2005, pp. 329-336.
Bay et al., Speeded-Up Robust Features (SURF), European Conference on Computer Vision, 2006, pp. 404-417.
Belongie et al., Shape Context: A New Descriptor for Shape Matching and Object Recognition, NIPS, 2000, pp. 831-837.
Ferrari et al., Groups of Adjacent Contour Segments for Object Detection, Sep. 2006, INRIA, No. 5980.
Medioni et al., Segment-Based Stereo Matching, CVGIP, 1985.
Gool et al., Affine/Photometric Invariants for Planar Intensity Patterns, ECCV, 1996, pp. 642-651.
Horaud et al., Stereo Correspondence Through Feature Grouping and Maximal Cliques, PAMI, 1989, pp. 1168-1180.
Lowe, Distinctive Image Features from Scale-Invariant Keypoints, IJCV, 2004, vol. 60 No. 2, pp. 91-110.
Mikolajczyk et al., A Performance Evaluation of Local Descriptors, PAMI, 2004, vol. 27 No. 10, pp. 1615-1630.
Mikolajczyk et al., A Comparison of Affine Region Detectors, IJCV, 2005, vol. 65 No. 1, pp. 43-72.
Deriche et al., Tracking Line Segments, European Conference on Computer Vision, 1990.
Schmid et al., Automatic Line Matching Across Views, CVPR, 1997.

\* cited by examiner

*Primary Examiner* — Daniel Mariam
(74) *Attorney, Agent, or Firm* — Pillsbury Winthrop Shaw Pittman LLP

(57) ABSTRACT

A method and system of matching features in a pair of images using line signatures. The method includes determining a first similarity measure between a first line signature in a first image in the pair of images and a second line signature in a second image in the pair of images; determining a second similarity measure between the first line signature in the first image and a third line signature in the second image; comparing the first similarity measure with a first threshold value; comparing a difference between the first similarity and the second similarity with a second threshold value; and if the first similarity measure is greater than the first threshold value and the difference between the first similarity and the second similarity is greater than the second threshold value, the first line signature and the second line signature produce a match.

63 Claims, 16 Drawing Sheets

IMAGE MATCHING USING LINE SIGNATURE

BACKGROUND OF THE INVENTION

1. Field of the Invention

The present invention pertains in general to image matching, image retrieval, object recognition and object tracking, and more particularly to a method and system for image matching using line signatures.

2. Discussion of Related Art

There are many existing methods for image matching. Most wide-baseline image matching methods are based on local features such as Scale Invariant Feature Transform (SIFT), shape context, Harris corner, and Speeded Up Robust Features (SURF). Repeatability and distinctiveness are two criteria used to evaluate a local feature. Repeatability is the ability that a counterpart of a feature in one image can be detected in the other image even under significant image deformation. Distinctiveness is the description of a feature should be similar to that of its corresponding feature while being very different from the description of any other feature. Often there is trade-off between repeatability an distinctiveness.

Most existing methods rely on local features which are pixel-based. In these pixel-based features each feature is a group of pixels in a connected local region. Typically, the connected region is of a rectangular shape in SIFT and the traditional template matching, the circular area in Shape context, and the elliptical region in Harris-Affine features. However, under large image deformation, it is common that similar regions in two images cannot be enclosed by templates with a fixed shape without including a considerable part of the background totally different in the two images. This is one of the reasons that the repeatability of the above local features decreases rapidly with view point change. Most feature descriptors use some kind of histograms, such as the histograms used in SIFT, Shape Context and Gradient Location-Orientation Histogram (GLOH). Histograms with fixed bin size are not distinctive when image distortion is large. Some descriptors are based on moments which can handle large deformation of planar patterns but have limited power to deal with non-planar distortion such as parallax change.

One of the problems in using local features is to detect feature correspondences under large image deformation caused by viewpoint change (especially for non-planar scenes), zooming and lighting variation. Most existing local features also have difficulties in matching images without rich texture.

Sketch signature which is based on curves instead of pixel solves some the above outlined problems. In sketch signature, curves are extracted from images and divided into contour segments including straight line segments and elliptical segments. A sketch signature is a cluster of nearby segments with an arbitrary spatial distribution. The number of segments in a sketch signature directly controls its distinctiveness. Since the number of its segments is small, it is also much easier to design a descriptor that can explicitly handle large image distortion.

There exist a certain amount of work on line-based image matching. The conventional line-based matching approaches can be divided into two types: matching individual line segments and matching groups of segments. Among the approaches of matching individual line segments, some methods match line segments based on their orientation and length and usually use a nearest line strategy. These methods are useful only when the images are very similar and are better suited to image tracking or small-baseline stereo. Some methods start with matching individual segments and resolve ambiguities by enforcing a weak constraint that adjacent line matches have similar disparities, or by checking the consistency of segment relationships, such as left of, right of, connectedness, etc. These methods require known epipolar geometry but cannot handle large image deformation. Many of these methods are computationally expensive for solving global graph matching problems.

Other line-based matching methods exploit the color distribution of the pixels on both sides of each segment, which is only reliable under small illumination change.

Perceptual grouping of line segments is widely used in object recognition and detection. It is based on perceptual properties such as connectedness, convexity, and parallelism so that segments are more likely on the same object. Although this strategy is useful to reduce searching space in detecting the same objects in totally different backgrounds, it is not suited to image matching since it is quite often that the only detectable fragment on the boundary of an object is indistinctive but it can form a distinctive feature with several neighboring fragments on different objects whose configuration is stable in a considerable range of viewpoint changes. As a result, many features very useful in image matching may be lost. In addition, the conventional line-clustering method does not provide a mechanism to handle spurious segments that may greatly deteriorate feature repeatability. Furthermore, the feature descriptor in the conventional line-segment clustering approach is only scale and rotation invariant. Therefore, these methods are limited and can suffer when other image transformations, such as large deformation including affine deformation, perspective distortion and parallax are applied.

The present invention addresses various issues relating to the above.

BRIEF SUMMARY OF THE INVENTION

An aspect of the present invention is to provide a method of transforming an image represented by an array of pixels having intensity values into a plurality of line signatures. The method includes deriving line segments from the intensity values of the pixels; designating a reference point for each of the plurality of line signatures; identifying a group of line segments from the derived line segments that are closest to the reference point; and generating the plurality of line signatures based on the identified group of line segments.

Another aspect of the present invention is to provide a method of matching features in a pair of images using line signatures. The method comprises determining a first similarity measure between a first line signature in a first image in the pair of images and a second line signature in a second image in the pair of images; determining a second similarity measure between the first line signature in the first image and a third line signature in the second image; comparing the first similarity measure with a first threshold value; comparing a difference between the first similarity and the second similarity with a second threshold value; and if the first similarity measure is greater than the first threshold value and the difference between the first similarity and the second similarity is greater than the second threshold value, the first line signature and the second line signature produce a match.

Another aspect of the present invention is to provide a system for matching features in a pair of images. The system comprises a computer processor configured to: determine a first similarity measure between a first line signature in a first image in the pair of images and a second line signature in a second image in the pair of images; determine a second similarity measure between the first line signature in the first image and a third line signature in the second image; compare the first similarity measure with a first threshold value; and compare a difference between the first similarity and the second similarity with a second threshold value. If the first similarity measure is greater than the first threshold value and the difference between the first similarity and the second similarity is greater than the second threshold value, the computer determines that the first line signature and the second line signature produce a match.

A further aspect of the present invention is to provide a method of matching features in a pair of images using line signatures. The method comprises determining a first best similarity measure and a second best similarity measure between a first line signature in a first image in the pair of images and a plurality of line signatures in a second image in the pair of images; comparing the first best similarity measure with a first threshold value; comparing the second best similarity measure with a second threshold value; and determining if the first similarity measure is greater than the first threshold value and the second best similarity measure is less than the second threshold value.

Although the various steps of the method of providing are described in the above paragraphs as occurring in a certain order, the present application is not bound by the order in which the various steps occur. In fact, in alternative embodiments, the various steps can be executed in an order different from the order described above or otherwise herein.

Extensive experiments validate that the line signature method according to an embodiment of the present invention described in further detail in the following paragraphs has better performance than conventional local features in matching relatively low-textured images, and non-planar structured scenes under large view point changes. The line signature method according to an embodiment of the present invention is robust to large scale changes and illumination variations, therefore it also has advantages over conventional wide-baseline line matching methods (e.g., Bay et al.'s method and Schmid et al.'s method).

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

In the accompanying drawings.

DETAILED DESCRIPTION OF EMBODIMENTS OF THE INVENTION

In one embodiment, an image represented by an array of pixels having intensity values is transformed into a plurality of line signatures by deriving line segments from the intensity values of the pixels, and generating the plurality of line signatures based on the line segments. Generating the plurality of line signatures is performed by designating a reference point for each of the plurality of line signatures and identifying a group of a line segments that are closest to the reference point.

In one embodiment the line segments are extracted from curves detected in an image. In one embodiment, the curves are extracted in the image by linking edge pixels detected with non-maximum suppression of gradient magnitude. Non-salient curves with the total gradient magnitude of their edge pixels below a threshold are removed. The curves are then divided into straight line segments.

Figure 1A:
FIG. 1A shows two linked segments.

Since no single scale (threshold on line fitting errors) can divide all the curves in two images in consistent ways, a multi-scale scheme is applied in which each curve is polygonized with a set of scales (i.e., with different tolerance values) and all possible segments are kept. FIG. 1A shows an example. The curve is divided into two segments ab and bc under a small tolerance value while it is approximated with only one straight line segment ac under a large tolerance value.

Figure 1B:
FIG. 1B shows two disconnected segments.

Because a segment in one image may be broken into several fragments in another image, two segments are merged if their gap is smaller than their length and their line fitting error is smaller than a threshold inversely-related to the gap. The original segments are kept in order to ensure repeatability. FIG. 1B is an example. Segments ab, cd and ad are all saved for further processing. However, the segments ab and cd can be grouped since the gap "bc" is smaller than the length of either segment ab and/or cd. Each segment is given an orientation. The orientation of the line segment is the direction parallel to the line with the gradient of its most edge pixels pointing from left to right. Each segment is also associated with a saliency value and a gradient magnitude that are the sum and the average of the gradient magnitude of its edge pixels.

Segment clustering is based on the spatial proximity and relative saliency between segments. For a segment i of saliency value s, a search is performed for the neighborhood of one of its endpoints for the top k segments that are closest to this end-point (based on the closest point not the vertical distance) and whose saliency values $s' \geq r \times s$, where r is a ratio. The segments k and i form a line signature. Segment i and the endpoint (edge of segment i) are the central segment and the center of the line signature, respectively. Similarly, another line signature can be constructed centered at the other endpoint (edge) of line i.

Figure 2A:
FIG. 2A depicts a plurality of line segments where a line signature centered at the endpoint $p_1$ of segment i and a line signature centered at endpoint $p_2$ of segment i can be constructed.

For example, in FIG. 2A, the line signature centered at the endpoint $p_1$ of segment i consists of segments {i, c, a, b}, when k=3. Note although segment e is closer to $p_1$ than a and b, it is not selected because it is not salient compared to i. The line signature centered at $p_2$ includes {i, d, a, c}.

Spatial proximity improves repeatability since the geometric configuration of nearby segments usually undergoes moderate variations over a large range of viewpoint changes. The present clustering approach is scale invariant. Compared to conventional methods where a rectangular window with a fixed size relative to the length of the central segment is used to group contours, the present clustering method is more robust to large image distortion and can guarantee feature distinctiveness.

Relative saliency was ignored in various conventional methods using grouping. However, relative saliency can play an important role in handling the instability of segment extraction. Weak segments in one image often disappear in another image. For example, segment e in FIG. 2A can disappear. However, if the central segment of a line signature in one image exists in another image, its other segments are less likely to disappear since they have comparable saliency ($s' \geq r \times s$). Based on this observation, line signatures centered at corresponding segments in tow images are more likely to be similar. In addition, this strategy provides features of different scales since with a strong central segment, i.e., a central segment having a relatively high saliency value, the other segments in a line signature are also strong, while those associated with weak central segments, i.e., central segments having a relatively low saliency value, are usually also weak. In one embodiment, tests have been performed using a ratio r of about 0.5. However, the results of the tests are not sensitive to the selection of a particular ratio r within a reasonable range, such as a ratio r between about 0.3 and about 0.8.

The number k is called the rank of a line signature. Increasing k can improve the distinctiveness of the line signature. However, increasing the number k will decrease the repeatability of the line signature and increase the computation in matching. In one embodiment, experimental results have shown that a k of about 5 is a balanced choice.

Figure 2B:
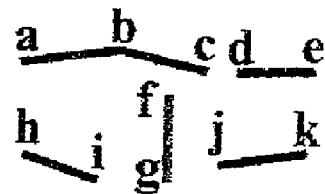
FIG. 2B depicts examples of line signature construction from a plurality of line segments depending on line segment grouping.
Figure 2C:
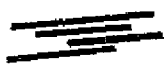
FIG. 2C depicts a plurality of closely spaced parallel line segments.

A practical issue during line signature construction is illustrated in FIG. 2B. Due to multi-scale polygonization and grouping, segments ab, bc and de can be regarded as three separate segments, or one segment ae. Therefore, for these two possibilities, two different rank-3 line signatures centered at endpoint f of segment fg can be constructed. One of rank-3 line signature is {fg, ab, bc, de} and the other rank-3 line signature is {fg, ae, jk, hi}. Another practical issue is depicted in FIG. 2C where several parallel segments are very close. This can occur commonly in man-made scenes. This configuration is usually unstable and line signatures composed mostly of such segments are indistinctive. Therefore, from a set of nearby parallel segments, our approach only selects the most salient one into a line signature.

Figure 3A:
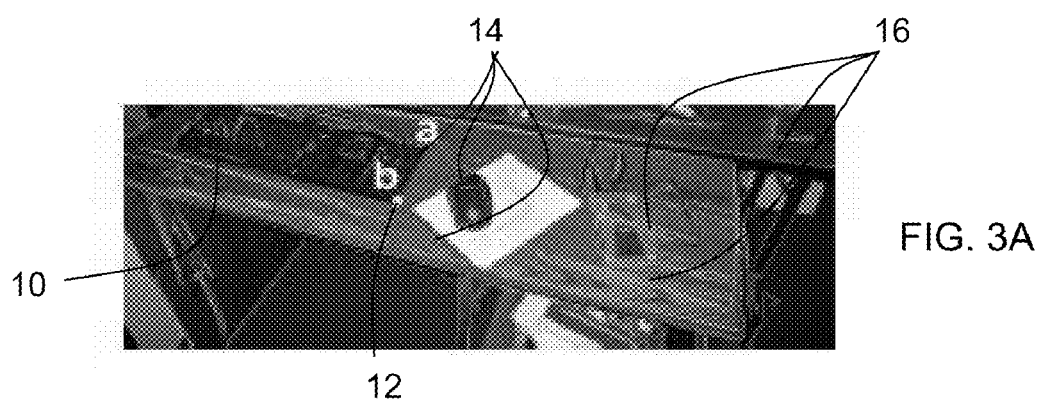
FIGS. 3A and 3B show two rank-5 line signatures in two corresponding images displaying a same scene viewed at different angles, according to an embodiment of the present invention.
Figure 3B:
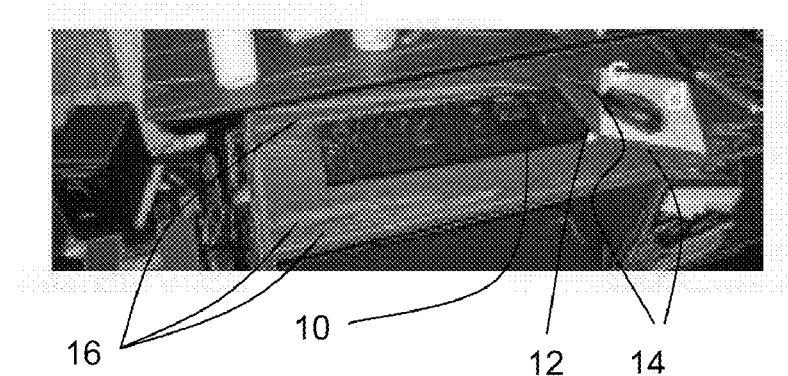

FIGS. 3A and 3B show two rank-5 line signatures whose central segments 10 are corresponding segments in two images. The centers of the line signatures are indicated with dot 12 and their other segments are indicated at 14. Other detected line segments 16 are also shown. Although most segments in the two line signatures can be matched, two of the lines ab and cd (ab in FIG. 3A and cd in FIG. 3B) cannot be matched. To be more robust to unstable segment extraction and clustering, the similarity measure between line signatures should allow unmatched segments.

The similarity between two line signatures is measured based on the geometric configuration of their segments. The approach by checking if the two segment groups satisfy an epipolar geometry is impractical since the endpoints of the segments are often inaccurate while infinite lines provide no epipolar constraint. Moreover, segment matches between two line signatures are few and some segments may share endpoints. As a result, the number of matched endpoints is usually insufficient to decide an epipolar geometry. It is also infeasible to compute the similarity based on whether the segments satisfy an affine matrix or a homography because the segments in a line signature are often not coplanar.

Figure 7A:
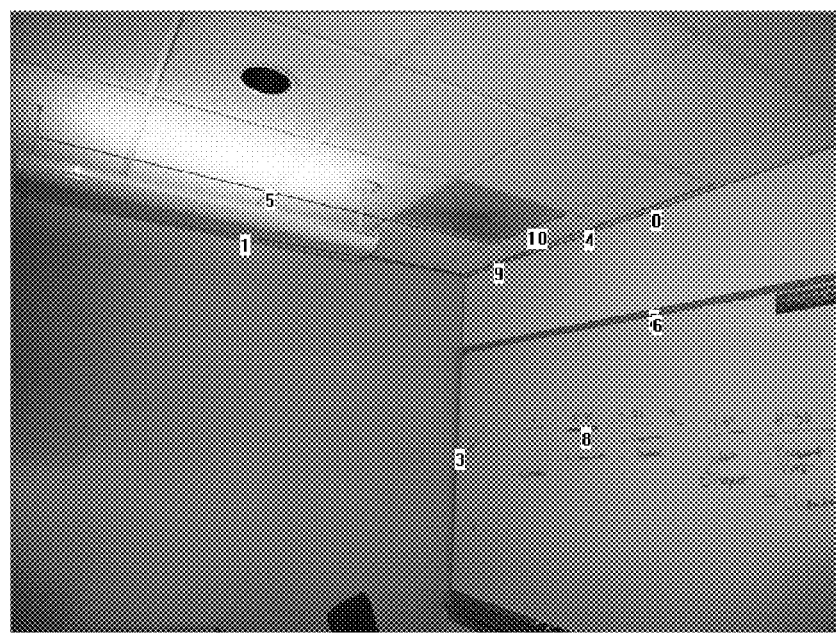
FIGS. 7A-7B, 8A-8B, 9A-9B, 10A-10B, 11A-11B, 12A-12B, and 13A-13B show corresponding pairs of images of a same general scene viewed at different angles and/or distances in which matched line segments detected by the wide-baseline image matching method according to an embodiment of the present invention are shown in black lines and are labeled with a same label at the midpoints of the line segments.
Figure 7B:
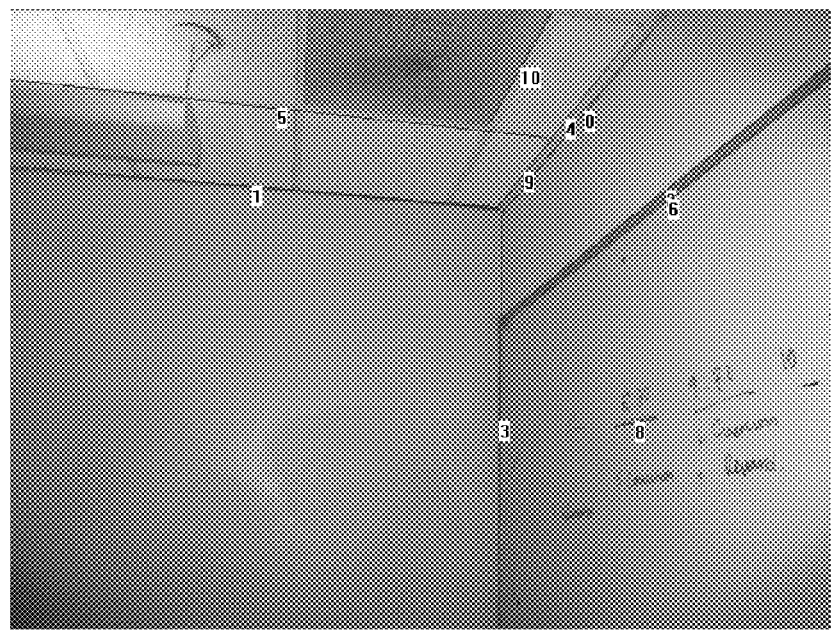

FIGS. 7A and 7B provide a good example where the neighboring lines forming the ceiling corner are on different planes but their configuration gives important information to match the images. In FIGS. 7A-7B, each detected segment is labeled by a number at the middle of the segment. The black segments with the same labels at their middle point in the image pair are corresponding segments detected with the method of the line signature method that will be described in further detail in the following paragraphs.

In one embodiment, the similarity is measured based upon pair-wise relationships between segments. In one embodiment, instead of describing relationships of segments with the central segment in a feature, the relationship between every two segments is described which provides a more distinctive approach.

Many conventional methods describe the relationship of two segments with terms such as left of, right of, connected, etc. The relationship between two segments can also be described with an angle and length ratio between the segments, and a vector connecting their middle points. However, all these methods are not distinctive, i.e., do not provide the desired distinctiveness so that a description of feature in one image is similar to that of its corresponding feature in another image while the description of the feature is different from the description of any other feature.

Figure 4A:
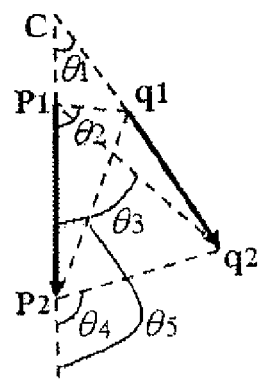
FIG. 4A depicts two line segments defining a line signature, according to an embodiment of the present invention.

In one embodiment, the configuration of two line segments is described by distinguishing two cases. In the first case, the two line segments are coplanar and in a local area so that they satisfy an affine transformation. As shown in FIG. 4A, the lines of two segments $p_1p_2$ and $q_1q_2$ intersect at c. The arrows in the segments represent their respective orientations.

The signed length ratios $$r_1 = \vec{p_1c} \cdot \vec{p_1p_2} / |\vec{p_1p_2}|^2, \text{ and}$$

$$r_2 = \vec{q_1c} \cdot \vec{q_1q_2} / |\vec{q_1q_2}|^2$$

are affine invariant. Therefore, these length ratios are good choices to describe two-segment configuration.

In addition, these two ratio neatly encode the information of connectedness ($r_1, r_2 = \{0, 1\}$) and intersection ($r_1, r_2$ in (0, 1)) which can be important structural constraints. Since the invariance of $r_1$ and $r_2$ is equivalent to an affinity, it is possible to determine if the transformation is affine with a threshold on the changes of $r_1$ and $r_2$.

If, on the other hand, the two segments are not coplanar or the perspective effect is significant, any configuration is possible if the underlying transformation can be arbitrarily large. However, since the two segments are proximate, in most cases the variations of the relative positions between their endpoints are moderate in a large range of viewpoint changes. The limit on the extent of transformation provides important constraints in measuring similarity, which is also the theory behind the Scale-Invariant Feature Transform (SIFT) descriptor (see, D. Lowe. Distinctive image features from scale-invariant keypoints. IJCV, 60(2):91-110, 2004). In the SIFT descriptor, the limit on the changes of pixel positions relative to its center is set with the bins of its histogram.

For two line segments, there are 6 pairs of relationships between 4 endpoints. For example, one of the two line segments can be selected, e.g., the vector $\vec{p_1p_2}$ in FIG. 4A, as the reference to achieve scale and rotation invariance. Each of the other 5 endpoint pairs ($q_1q_2$, $q_2p_1$, $q_1p_2$, $q_1p_1$, $q_2p_2$) is described with the angle and the length ratio (relative to $\vec{p_1p_2}$) of the vector connecting its two points. Specifically, the attributes are $l_1=|q_1q_2|/|p_1p_2|$, $l_2=|q_1p_1|/|p_1p_2|$, $l_3=|q_1p_2|/|p_1p_2|$, $l_4=|q_2p_1|/|p_1p_2|$, $l_5=|q_2p_2|/|p_1p_2|$, $\theta_{1-5}$, where $l_1$-$l_5$ represent the length ratios of distances between endpoints of the line segments $p_1p_2$ and $q_1q_2$, and $\theta_{1-5}$ represent angles between respective two lines connecting two endpoints of the line segments $p_1p_2$ and $q_1q_2$.

Figure 4B:
FIG. 4B is an example showing different positions of an endpoint of one segment in a line signature illustrating the need of a number of attributes to describe the locations of each point relative to other points in the line segments.

Note that although the absolute locations of points $q_1$ and $q_2$ can be described with only 4 coordinates, 10 attributes may be needed to describe the locations of each point relative to all the other points since the determination of shape similarity may be different with different reference points. An example is illustrated in FIG. 4B where the position change from $q_1$ to $q'_1$ relative to $p_2$ is not large ($\Delta\theta_5$ and $\Delta l_3$ are small) whereas the change relative to $p_1$ is very large ($\Delta\theta_5 > \pi/2$).

In addition, an extra attribute $g = g_2/g_1$ can be used to describe the appearance information, where $g_1$ and $g_2$ are the average gradient magnitude of the two segments. This attribute is robust to illumination changes and helps to further improve the distinctiveness. Therefore, the feature vector to describe a two-segment configuration contains in total 13 attributes: $v = \{r_{1-2}, l_{1-5}, \theta_{1-5}, g\}$.

The 12 attributes describing the geometric configuration are computed from the 8 coordinates of 4 endpoints. There is no conflict with the degree of freedom. The 12 attributes are dependent, and are essentially intermediate computation results stored in the feature vector to make the following similarity computation more efficient.

Similarly, 13 attributes describing the geometric configuration $v' = \{r'_{1-2}, l'_{1-5}, \theta'_{1-5}, g'\}$ in the second image can be computed in the same fashion as discussed above for the pair of segments in the first image.

$$r'_1 = \vec{p'_1c'} \cdot \vec{p'_1p'_2} / |\vec{p'_1p'_2}|^2,$$

$$r'_2 = \vec{q'_1c'} \cdot \vec{q'_1q'_2} / |\vec{q'_1q'_2}|^2,$$

$$l'_1 = |q'_1q'_2|/|p'_1p'_2|,$$

$$l'_2 = |q'_1p'_1|/|p'_1p'_2|,$$

$$l'_3 = |q'_1p'_2|/|p'_1p'_2|,$$

$$l'_4 = |q'_2p'_1|/|p'_1p'_2|,$$

$$l'_5 = |q'_2p'_2|/|p'_1p'_2|,$$

$$\theta'_{1-5}, \text{ and}$$

$$g' = g'_2/g'_1,$$

where $\vec{p'_1p'_2}$ is the first line segment and $\vec{q'_1q'_2}$ is the second line segment, $\vec{p'_1c'}$ is a vector between endpoint $p'_1$ and intersection point c' between first line segment $p'_1p'_2$ and second line segment $q'_1q'_2$, $\vec{q'_1c'}$ is a vector between endpoint $q'_1$ and intersection point c' between first line segment $p'_1p'_2$ and second line segment $q'_1q'_2$, $|p'_1p'_2|$ is the length of the first segment between endpoints $p'_1$ and $p'_2$, $|q'_1q'_2|$ is the length of the second segment between endpoints $q'_1$ and $q'_2$, $|q'_1p'_1|$ is the length between endpoints $q'_1$ and $p'_1$, $|q'_1p'_2|$ is the length between endpoints $q'_1$ and $p'_2$, $|q'_2p'_1|$ is the length between endpoints $q'_2$ and $p'_1$, $|q'_2p'_2|$ is the length between endpoints $q'_2$ and $p'_2$, $r'_1$ and $r'_2$ are length ratios, where $l'_1$-$l'_5$ represent the length ratios of distances between endpoints of the line segments $p'_1p'_2$ and $q'_1q'_2$, and $\theta'_{1-5}$ represent angles between respective two lines connecting two endpoints of the line segments $p'_1p'_2$ and $q'_1q'_2$, and $g'_1$ and $g'_2$ are the average gradient magnitude of the two segments.

In the similarity computation, two feature vectors of two segments pairs are used. It is assumed that the feature vectors are as follows: $v = \{r_{1-2}, l_{1-5}, \theta_{1-5}, g\}$ and $v' = \{r'_{1-2}, l'_{1-5}, \theta'_{1-5}, g'\}$, respectively. If $|r_1-r'_1|$ and $|r_2-r'_2|$ are smaller than a threshold Tr, the underlying transformation can be regarded as affine. In this case, the similarity of the two segment pairs is an affine similarity, otherwise it is a general similarity.

In the case of affine similarity, to be completely affine invariant, the affine similarity should be based only on $r_i$ and $r'_i$. However, from experiments, it is determined that matching results can be improved by limiting the range of the changes of length ratio $l_1$ and angle $\theta_1$, which increases feature distinctiveness. In one embodiment, the affine similarity Sa is computed using the following relationship:

$$Sa = dr_1 + dr_2 + d\theta_1 + dl_1 + dg, \text{ if } \Gamma = \text{true, and} \quad (1)$$
$$Sa = -\infty, \text{ else}$$
where:
$$dr_i = 1 - \frac{|r_i - r_i'|}{T_r}, i \in \{1, 2\}; \quad (2)$$
$$d\theta_1 = 1 - \frac{|\theta_1 - \theta_1'|}{T_\theta};$$
$$dl_1 = 1 - \frac{\max(l_1, l_1')/\min(l_1, l_1') - 1}{T_l};$$
$$dg = 1 - \frac{\max(g, g')/\min(g, g') - 1}{T_g};$$
$$\Gamma \equiv \{dr_i, d\theta_1, dl_1, dg\} \geq 0 \ \& \ (\theta_1 - \pi)(\theta_1' - \pi) \geq 0$$

where $T_r$, $T_\theta$, $T_l$ and $T_g$ are thresholds.

Figure 4C:
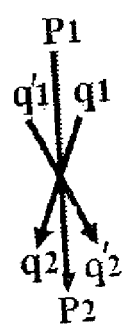
FIG. 4C is a configuration where a deformation or transformation from of one line segment to another line segment not satisfying an angular condition, according to an embodiment of the present invention.

If a change of an attribute is larger than its threshold ({$dr_i$, $d\theta_1$, $dl_1$, $dg$}<0), the deformation between the segment pairs is regarded as impractical and their similarity is $Sa=-\infty$. It is worth noting that the thresholds $T_r$, $T_\theta$, $T_l$ and $T_g$ play similar roles as the bin dimensions in the histograms of local features (in the SIFT method) in which the location change of a pixel between two images is regarded as impractical if it falls into different bins. The thresholds $T_r$, $T_\theta$, $T_l$ and $T_g$ are also used to normalize the contribution of different attributes so that $dr_i$, $d\theta_1$, $dl_1$, $dg \in [0, 1]$. In addition, the thresholds greatly reduce the computation since if the change of any attribute is larger than a threshold, the similarity is $Sa=-\infty$ without performing the rest of the computation. This leads to a codebook that is described further in detail in the following paragraphs. Through experiments, it is determined that $T_r=0.3$, $T_\theta=\pi/2$, $T_l=T_g=3$ are good choices. The condition $(\theta_1-\pi)(\theta_1'-\pi) \geq 0$ ($\theta_1, \theta_1' \in [0, 2]$) is used to avoid the situation in FIG. 4C where a deformation from $q_1 q_2$ to $q'_1 q'_2$ is affine but rarely happens in practice.

In an alternative embodiment, an alternative way to measure affine similarity is to fit an affinity to the 4 endpoints of the segments and estimate the fitting error. However, computing an affine matrix for all combinations of segment pairs may be inefficient. In addition, the endpoint locations are less accurate than the orientations of lines, so the approach based on the length ratios along the line orientations is more robust. More importantly, unlike $r_i$, the affine matrix does not directly reflect the constraints of connection and intersection.

In one embodiment, the general similarity is measured based on the relative positions between the 4 endpoints, using the following equations.

$$Sg = \sum_{i=1}^{5} dl_i + \sum_{i=1}^{5} d\theta_i + dg, \text{ if } \{dl_i, d\theta_i, dg\} \geq 0 \ \& \ !C \quad (3)$$
$$Sg = -\infty, \text{ else}$$

where $dl_i$, $d\theta_i$ and $dg$ are computed as follows:

$$dl_i = 1 - \frac{\max(l_i, l_i')/\min(l_i, l_i') - 1}{T_l},$$

$$d\theta_i = 1 - \frac{|\theta_i - \theta_i'|}{T_\theta}, \text{ and}$$
$$dg = 1 - \frac{\max(g, g')/\min(g, g') - 1}{T_g},$$

where $dl_i$, $d\theta_i$ and $dg$ are computed in the same way as in the equations 2. Specifically, $dl_i$, $d\theta_i$ and $dg$ are computed as follows:

$$dl_i = 1 - \frac{\max(l_i, l_i')/\min(l_i, l_i') - 1}{T_l},$$
$$d\theta_i = 1 - \frac{|\theta_i - \theta_i'|}{T_\theta}, \text{ and}$$
$$dg = 1 - \frac{\max(g, g')/\min(g, g') - 1}{T_g}.$$

Figure 4D:
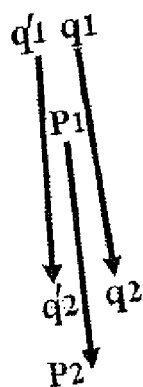
FIG. 4D illustrates a configuration where endpoints of a line segment cross a median line segment.

Since the endpoints are connected by line segments, the situation depicted in FIG. 4D where $q_2$ jumps across segment $p_1 p_2$ to $q'_2$ (in this case $p_1 p_2$ and $q_2 q'_2$ intersect) is impractical. The symbol "C" represents the situation in FIG. 4D, and the symbol "!C" indicates that this situation should not exist.

Combining the above two cases of similarity, the overall similarity S of two segment pairs is computed with the following equation.

$$S = Sa, \text{ if } |r_i - r_i'| \leq T_r \quad (4)$$
$$S = \frac{1}{4} S_g, \text{ else}$$

The coefficient ¼ provides $S_g$ with a lower weight so that its maximal contribution to S is 2.75 which is smaller than that of $S_a$ equal to 5. Specifically, according to equation (3), since $dl_i$, $d\theta_i$, and $dg$ are all smaller than 1, the maximal value of $S_g$ is 11. As a result, $\frac{1}{4} * S_g$ is less than 2.75. Similarly, according to equation (1), since $dr_1$, $dr_2$, $d\theta_1$, $dl_1$ and $dg$ are all smaller than 1, the maximum value of $S_a$ is 5 (where 5 corresponds to the sum of all maximum values of the five attributes). This reflects that the affine similarity (affinity) is a stronger constraint so segment pairs satisfying an affinity are more likely to be matched.

Given two line signatures, their similarity is the sum of the similarity between their corresponding segment pairs. However, the mapping between their segments is unknown except the central segments. One conventional approach (see V. Ferrari et al. Groups of adjacent contour segments for object detection. PAMI, 30(1):36-51, 2008) sorts the segments in each feature according to the coordinates of their middle points, and the segment mapping is determined directly by the ordering. However, this ordering may not be robust under large image deformation and inaccurate endpoint detection. In addition, as mentioned before, some segments in a line signature may not have their counterparts in the corresponding line signature in the corresponding transformed image due to unstable segment detection and clustering. In one embodiment of the present invention, instead of ordering segments, the optimal segment mapping that maximizes the similarity measure between the two line signatures (one line signature in the image and the corresponding line signature in the corresponding transformed image) is determined.

A one-to-one mapping between segments can be expressed as follows:

$$M=\{(l_i,l'_j),\ldots,(l_k,l'_k)\}$$

where $\{l_i,\ldots l_k\}$ and $\{l'_i,\ldots l'_k\}$ are subsets of the segments in the first and the second line signatures. The central segments must be a pair in M. If one assumes that the similarity of two segment pairs $(l_i, l_j)$ and $(l'_i, l'_j)$ is $S_{ij}$, where $(l_i, l'_i) \in M$ and $(l_j, l'_j) \in M$. The similarity of the two lines is calculated using the following equation (5).

$$S_{LS} = \max_M \sum_{i<j} S_{ij} \quad (5)$$

For most segment pairs, their similarities are $-\infty$ because their differences on some attributes are larger than the thresholds. Therefore, by quantizing the feature space into many types (subspaces) with the difference between different types on at least one attribute larger than its threshold, segment pairs with a similarity of $-\infty$ can be found directly, based on their types without explicit computation.

Since the similarity measure has two cases, the quantization is conducted in two feature spaces: the space spanned by $\{r_i, \theta_1, l_1\}$ for affine similarity and the space spanned by $\{\theta_i, l_i\}$ for general similarity.

From experiments, it is determined that for a segment pair whose segments are not nearly intersected, the affine similarity Sa of the segment pair is almost always $-\infty$, if its general similarity Sg with another segment pair is $-\infty$. Specifically, if the general similarity is $-\infty$, this means that the change of relative positions between endpoints is too large, and usually this also means that the change of $r_i$, $\theta_1$ or $l_1$ is too large. As a result, the affine similarity will also be $-\infty$. If the two segments are intersected or close to be intersected, as shown in FIG. 4F, this may not hold true where the general similarity Sg is $-\infty$ because $q_1$ jumps across $p_1p_2$ to $q'_1$ but the affine similarity Sa is not $-\infty$, which usually happens due to inaccurate endpoint detection. In this case, the position change from $q_1$ to $q'_1$ is small. Hence, the changes of $r_i$, $\theta_1$ or $l_1$ are all very small. Therefore, according to equation (1), the affine similarity is not $-\infty$. However, the general similarity is $\infty-$ because the position change from $q_1$ to $q'_1$ violates the condition "!C" in equation (3). Therefore, the quantization of the feature space spanned by $\{r_i, \theta_1, l_1\}$ is conducted only in its subspace where $r_i \in [-0.3, 1.3]$. The segment pairs within this subspace have types in two feature spaces, while the others have only one type in the space of $\{\theta_i, l_i\}$ which is enough to judge if the similarities are $-\infty$.

The space of $\{r_i, \theta_1, l_1\}$ is quantized as follows: The range $[0.3, 1.3]$ of $r_1$ and $r_2$ and the range $[0, 2\pi]$ of $\theta_1$ are uniformly divided into 5 and 12 bins respectively. The range of $l_1$ is not divided. Therefore, there are 300 types (that is 5 bins for $r_1$ *5 bins for $r_2$*12 bins for $\theta_1$).

The quantization of the space spanned by $\{\theta_i, l_i\}$ is not straightforward since it is large and has a relatively high dimension. Based upon experiments, it is determined that the following approach is effective in quantizing the space.

Figure 4E:
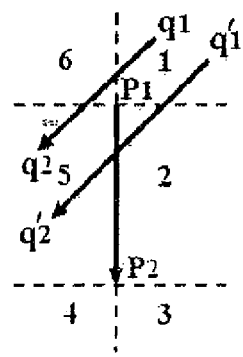
FIG. 4E depicts various lines segments in an image space divided into 6 regions according to one line segment, according to an embodiment of the present invention.
Figure 4F:
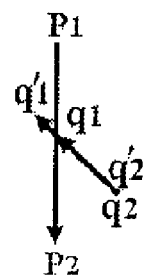
FIG. 4F depicts two lines segments intersecting or nearly intersecting another line segment.
Figure 5A:
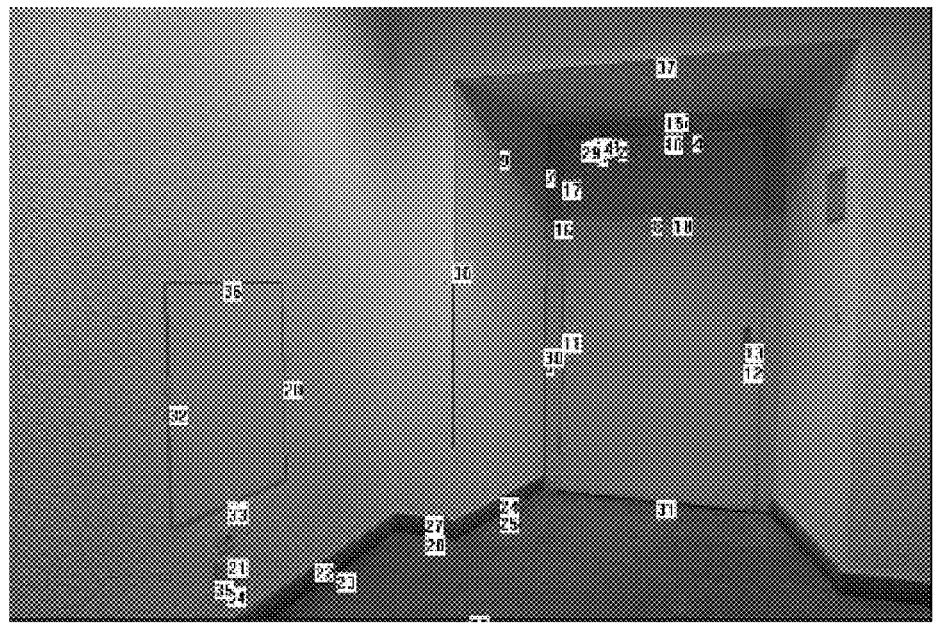
FIGS. 5A and 5B show corresponding images in which the segments labeled with the same labels at their respective midpoints are corresponding matched line segments detected with the method of wide-baseline image matching, according to an embodiment of the present invention.
Figure 5B:
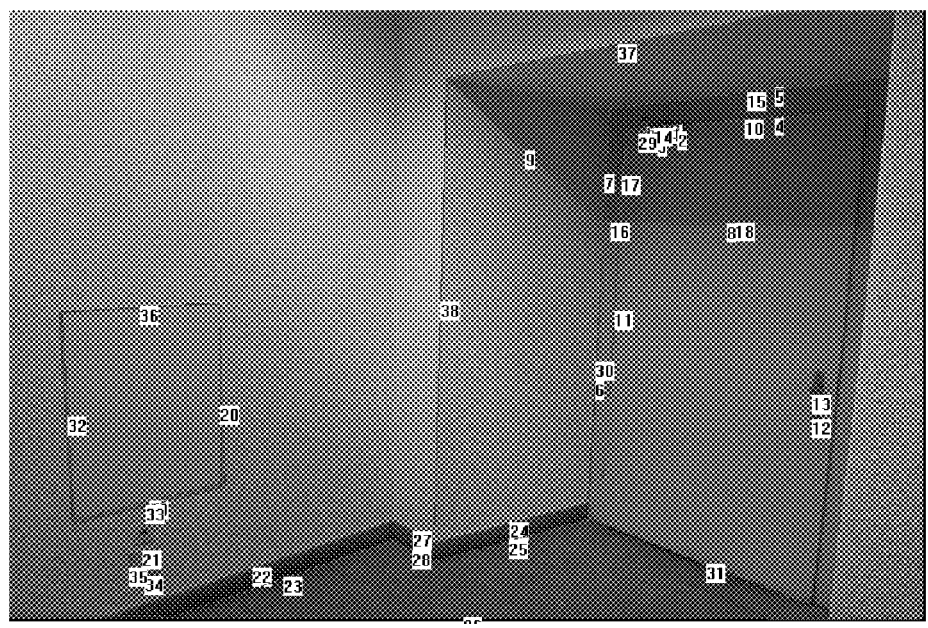

The image space is divided into 6 regions according to $p_1p_2$ as shown in FIG. 4E. Thus, there are 36 different distributions of the two endpoints $q_1q_2$ in these regions (the 36 distributions are calculated according to the positioning of the two endpoints $q_1$ and $q_2$ in each of the 6 regions). When the endpoints are on different sides of $p_1p_2$, the intersection of the two lines can be above, on, or below the segment $p_1p_2$. The reason to distinguish the 3 cases is that they cannot change to each other without being the condition C in Equation (3). As discussed in the previous paragraphs, the condition C indicates one of the endpoint changes its position from one side of a line segment to the other side of the line segment. The change of the intersection of the two segments from one status (above, on or below $p_1p_2$) to another is such a condition C. For example, if $q_1q_2$ changes to $q'_1q'_2$ in FIG. 4E, point $p_1$ will jump across $q_1q_2$. The range of $\theta_1$ is uniformly divided into 12 bins. Thus, there are 264 types. This is calculated by enumerating all the possibilities. As shown in FIG. 4E, if $q_1$ and $q_2$ are in the same region (region 1, region 2, region 3, region 4, region 5, or region 6), the angle $\theta_1$ has 12 possible types, and so there are 6*12 such cases (i.e., 72 cases). If $q_1$ and $q_2$ are on the same side of the line segment $p_1p_2$ but in different regions, there are 12 such distributions, and for each such distribution the angle $\theta_1$ has 6 possible types since it can only span half of a circle. Therefore, there are totally 12*6 such cases (i.e., 72 cases). If $q_1$ and $q_2$ are in regions 1 and 6, or regions 2 and 5, or regions 3 and 4 separately, there are 6 such distributions, and for each such distribution the angle $\theta_1$ has 6 possible types since it can only span half of a circle. Therefore, there are totally 6*6 such cases (i.e., 36 cases). If $q_1$ and $q_2$ are in regions 1 and 5, or regions 2 and 6, or regions 3 and 5, or regions 4 and 2, there are 8 such distributions, and for each such distribution the angle $\theta_1$ has 3 possible types since it can only span a quadrant and there are 2 possible types of intersection. Therefore, there are totally 8*3*2 such cases (i.e., 48 cases). If q1 and q2 are in regions 1 and 4, or regions 6 and 3, there are 4 such distributions, and for each such distribution the angle $\theta_1$ has 3 possible types since it can only span a quadrant and there are 3 possible types of intersection. Therefore, there are totally 4*3*3 such cases (i.e., 36 cases). Overall, there are 72+72+36+48+36=264 types. Some configurations are meaningless, e.g., when $q_1$ and $q_2$ are in region 6 and 2 respectively (as shown in FIG. 4E), $\theta_1$ can only be in $(0, \pi/2)$. For instance, if the center of the line segment $q_1q_2$ is at point $p_1$, and the line segment $q_1q_2$ can rotate around its center. Then, in order to keen point $q_1$ in region 6, and $q_2$ in region 2, the rotation angle $\theta_1$ can only be in the range from 0 to $\pi/2$.

Therefore, there are totally 564 types. This number of types (564 types) is determined by adding the number of types obtained previously for the space $\{r_i, \theta_1, l_1\}$, i.e., 300 types, and the number of total types in FIG. 4E calculated above, i.e., 264 types. As it can be appreciated, more types can be obtained with finer quantization. However, more quantization requires more memory. Each segment pair has one or two types depending on if $r_i \in [-0.3, 1.3]$. The types of a segment pair are called its primary keys. In addition, according to the deformation tolerance decided by the thresholds $T_r$ and $T_\theta$, the condition $(\theta_1-\pi)(\theta'_1-\pi) \geqq 0$ in Equation (2), and the condition C in Equation (3), the possible types of a segment pair in another image after image deformation (e.g., an endpoint in region 2 can only change to region 1 or 3) can be predicted. These predicted types are the keys of a segment pair. The similarity of a segment pair with another segment pair is not $-\infty$ only if one of its primary keys is one of the keys of the other segment pair.

For each line signature, the keys of the segment pairs consisting of its central segment and each of its other segments are counted in a histogram of 564 bins with each bin representing a type. In addition, each bin is associated with a list storing all the segments that fall into the bin. To measure the similarity of two line signatures, assume the segment pair consisting of segment i and the central segment in the first line signature has a primary key of p. The segments in the second line signature that may be matched with i can be directly read from the list associated with the p-th bin of its histogram.

From experiments, the average number of such candidate segments is found to be only 1.6. Only these segments are checked to see if one of the segments can really be matched with i (by checking if the differences on all feature attributes are smaller than the corresponding thresholds). If a segment can be matched with i, a variable $c_i=1$, otherwise $c_i=0$ is set.

An approximate similarity of two line signatures can be computed with $$S'_{LS} = \sum_i c_i.$$

Only if $S'_{LS} \geqq 3$ (meaning at least 3 segments besides the central segment in the first line signature may have corresponding segments in the second signature). Equation (5) is used to compute the accurate similarity $S_{LS}$ otherwise $S_{LS}$ is 0. In average, for each line signature in the first image, only 2% of the line signatures in the second image have $S'_{LS} \geqq 3$. Equation (5) is solved with an exhaustive search but the searching space is greatly reduced since the average number of candidate segment matches is smaller.

To match two images, for each line signature in an image, its top two most similar line signatures in the other image are found whose similarity values are $S_1$ and $S_2$ respectively. If $S_1 > T_1$ and $S_1 - S_2 > T_2$, this line signature and its most similar line signature produce a putative correspondence, and the segment matches in their optimal mapping M in Equation (5) are putative line segment matches. The second condition $S_1 - S_2 > T_2$ is provided to insure that the line signature is distinctive. In one embodiment, in the experiments, $T_1 = 25$ and $T_2 = 5$ in our experiments.

To remove outliers (observations that is numerically distant from the rest of the data), Random Sample Consensus (RANSAC) iterative method may not be used based on epipolar geometry since the endpoints of line segments are inaccurate. In one conventional method (H. Bay et al. Wide-baseline stereo matching with line segments. CVPR, pages 329-336, 2005), putative segment matches are first filtered with a topological filter based on the sidedness constraints between line segments. Among the remaining matches, coplanar segments are grouped using homographies. The intersection points of all pairs of segments within a group are computed and used as point correspondences based on which the epipolar geometry is estimated with Random Sample Consensus (RANSAC). In one embodiment of the present invention, instead of using the topological filter based on the sidedness constraints between line segments as described above, which can be computationally expensive, a more efficient approach to remove most of the outliers is used.

All the putative line signature correspondences are put into a list L and sorted by descending the value of $S_1 - S_2$. Due to the high distinctiveness of line signatures, the several candidates on the top of the list L almost always contain correct ones if there is one.

If R is the set of line segment matches of the two images, and R is initialized by $R = \phi$. Two segment matches are regarded as consistent if the similarity of the two segment pairs based on them is not $-\infty$. A segment match in the optimal mapping M of a line signature correspondence is a reliable match if the similarity of the two segment pairs formed by its segments and the central segments is larger than 3.5. Starting from the top of L, for a line signature correspondence, if all the segment matches in its optimal mapping M are consistent with all the existing matches in R, the reliable ones will be added into R. To reduce the risk that the top one candidate on L is actually wrong, each of the top 5 candidates will be used as a tentative seed to grow a set R. The one with the most number of matches will be output as the final result.

After the above consistency checking, most of the outliers are removed. To further reduce the outliers and estimate the epipolar geometry, coplanar segments are grouped and the RANSAC procedure can be used.

Comparisons of line signature with existing line matchers and local features are shown in FIGS. 5A-5B and 6A-6B. Throughout the experiments, the parameters in the present line signature approach are fixed (the parameters are given in the previous paragraphs). The parameters are selected empirically based on extensive experiments. The selected parameters are applicable for a wide range of images.

Figure 6A:
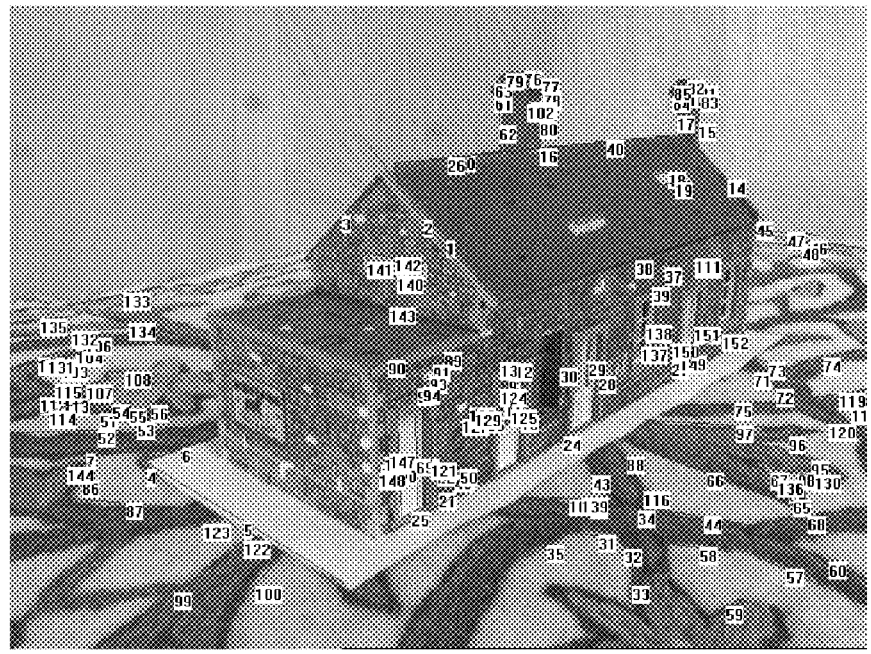
FIGS. 6A and 6B show corresponding images in which the segments labeled with the same labels at their respective midpoints are corresponding matched line segments detected with the method wide-baseline image matching, according to an embodiment of the present invention.
Figure 6B:
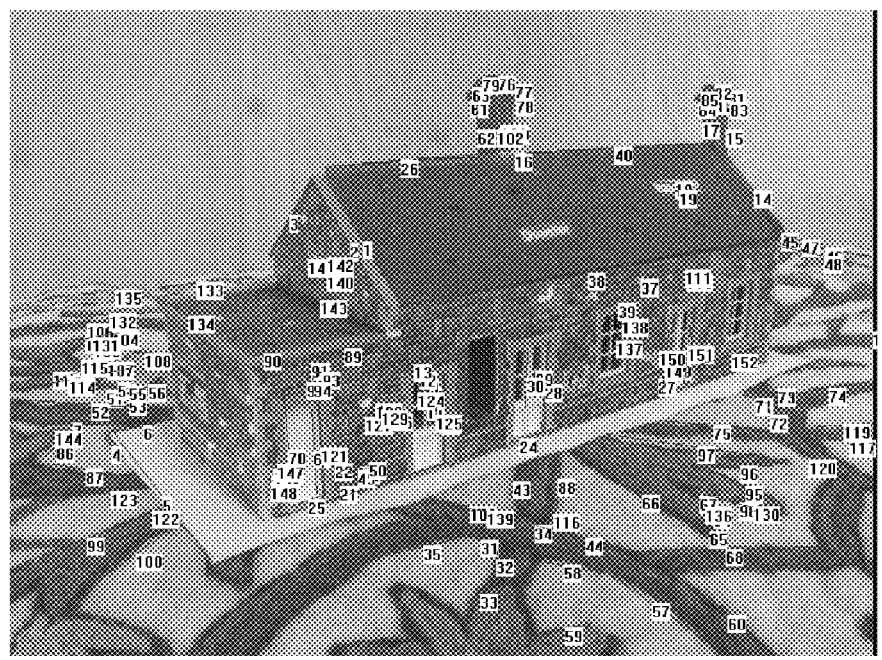

FIGS. 5A-5B and FIGS. 6A-6B show 2 image pairs. The segments labeled with the same labels at their middle points are corresponding line segments detected with the method of wide-baseline image matching based on line signature described herein. The correctness of the matches is judged visually. In FIGS. 6A-6B, the conventional method (H. Bay et al. Wide-baseline stereo matching with line segments. CVPR, pages 329-336, 2005) detects 21 matches (16 correct), and the number increases to 41 (35 correct) after matching propagation, while the present wide-baseline image matching method detects 39 matches (all correct) without matching propagation.

FIGS. 7A, 7B, 8A, 8B, 9A, 9B, 10,A, 10B, 11A, 11B, 12A, 12B, 13A, 13B show pairs of corresponding images. In FIGS. 7A-7B, 8A-8B, 9A-9B, 10A-10B, 11A-11B, 12A-12B, 13A-13B each detected segment is labeled by a number at the middle of the segment. The black segments with the same labels at their middle point in an image pair are corresponding segments detected with the method of the line segment method described herein. In the images shown in these FIGs., performance of line signature with three well-known local features: SIFT, MSER, and Harris-Affine features is compared to the performance of line signature using the method described herein. The MSER and Harris-Affine regions are described with the SIFT descriptor with the threshold 0.6. The comparison is based on three cases: low-texture, non-planar, and planar scenes.

FIGS. 7A, 7B and 8A-8B illustrate the matching results of the present method on two low-texture image pairs. The comparison of the present line signature method with the three local features SIFT, Harris Affine, and MSER is reported in Table 1 for images sets shown in FIGS. 7A-7B, 8A-8B, 9A-9B, 10A-10B, and 11A-11B.

TABLE 1

Figure 8A:
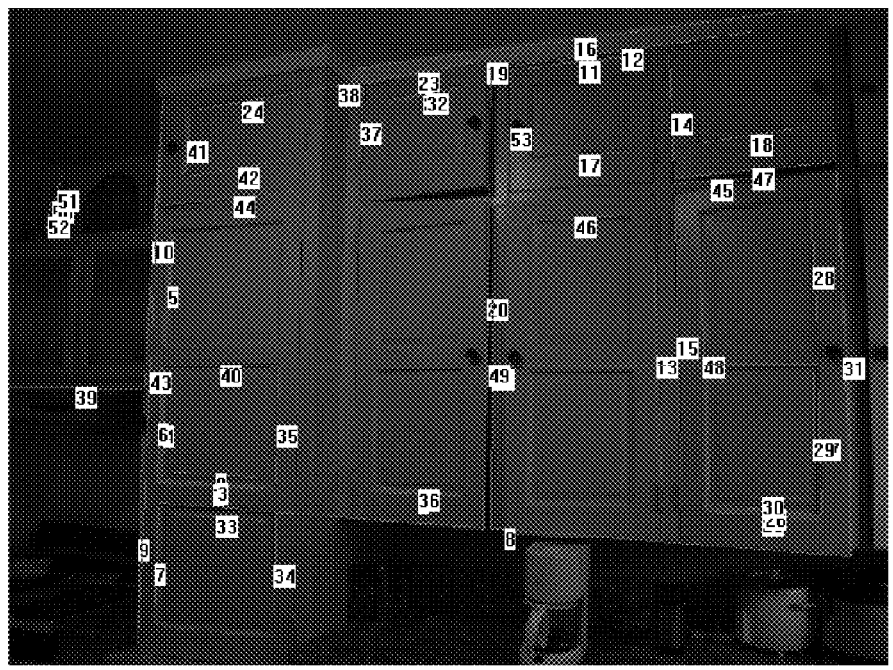
Figure 8B:
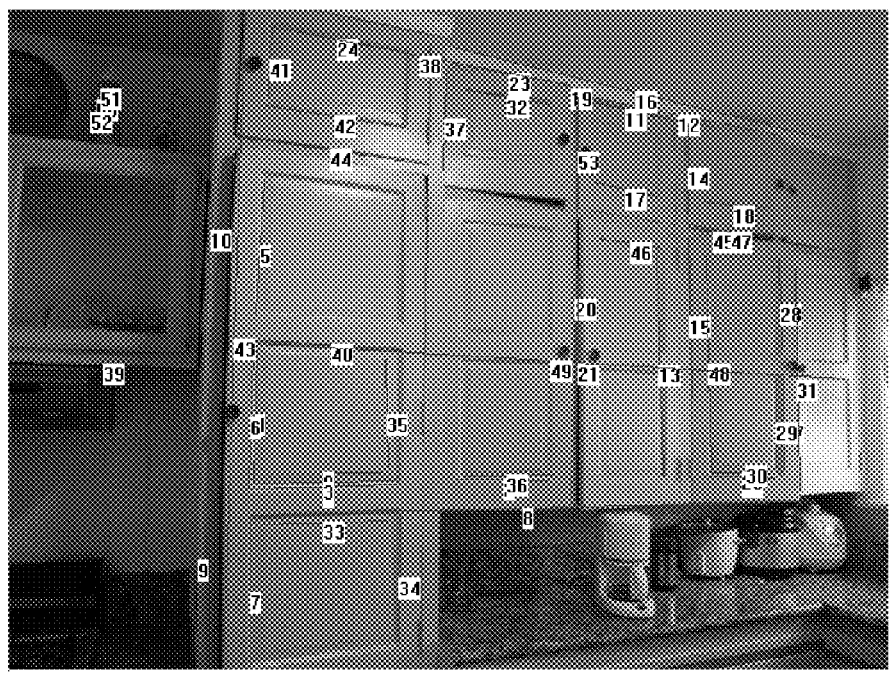
Figure 9A:
Figure 9B:
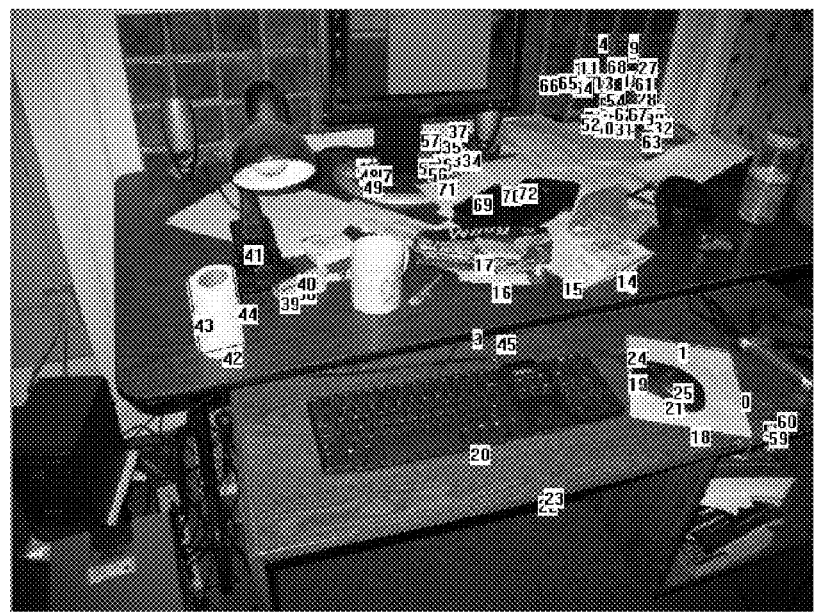
Figure 10A:
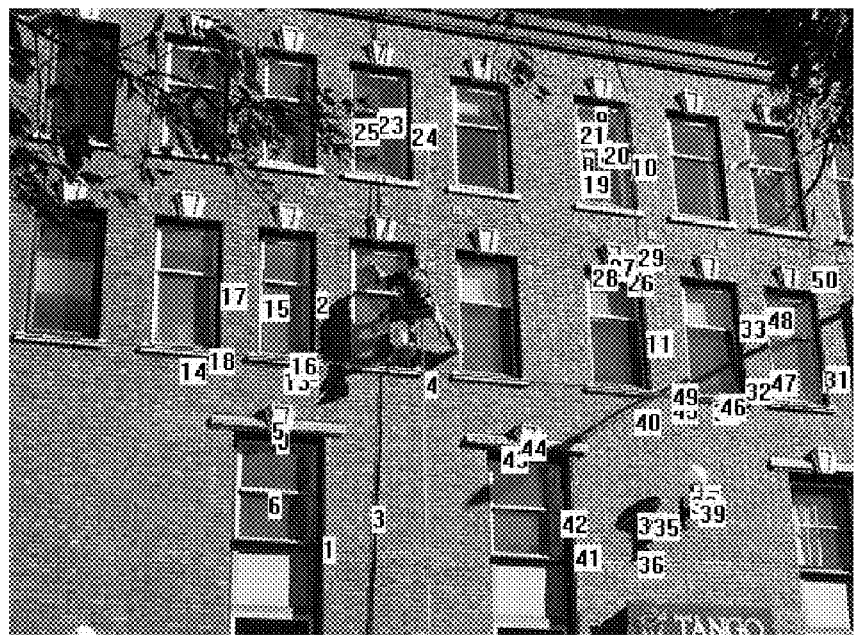
Figure 10B:
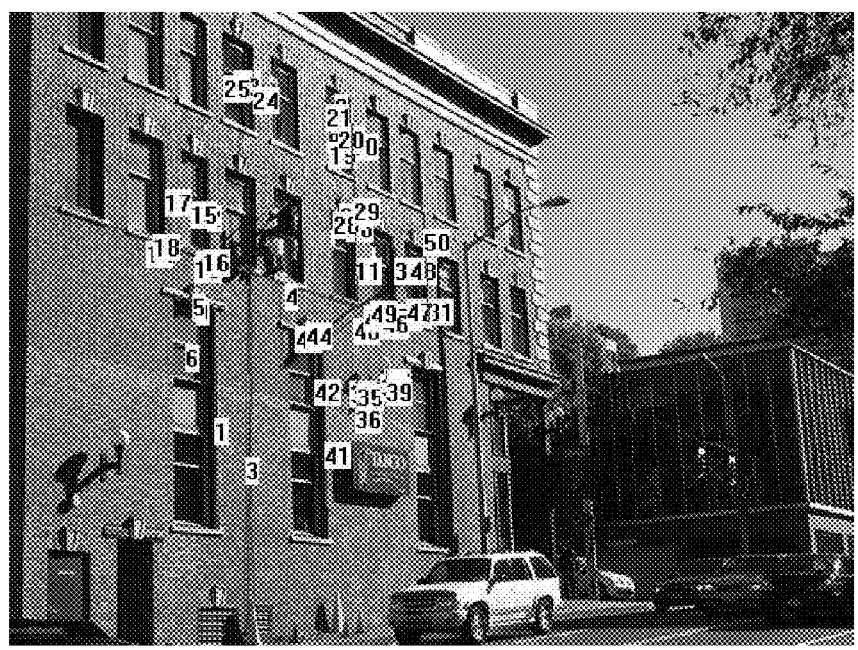
Figure 11A:
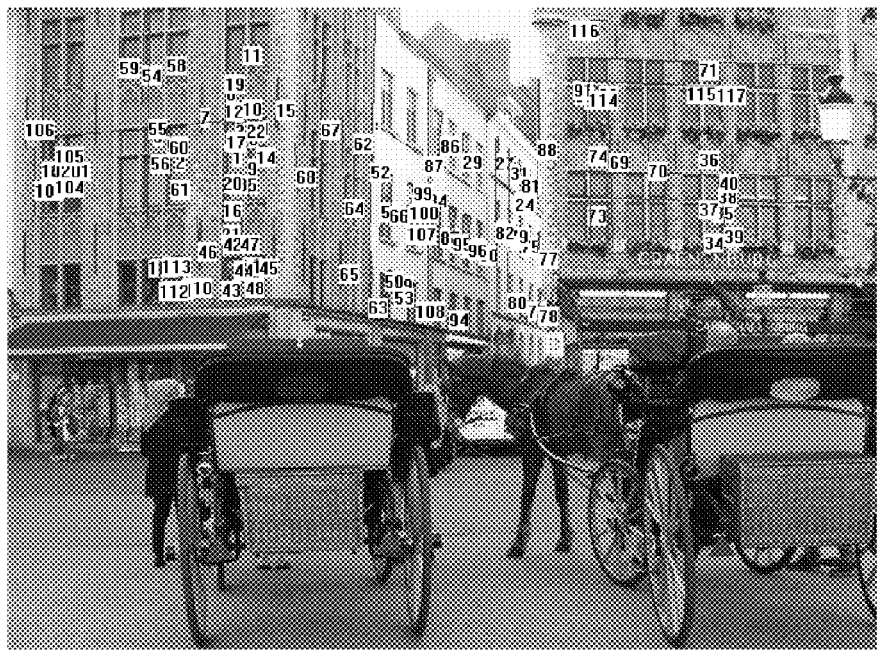
Figure 11B:
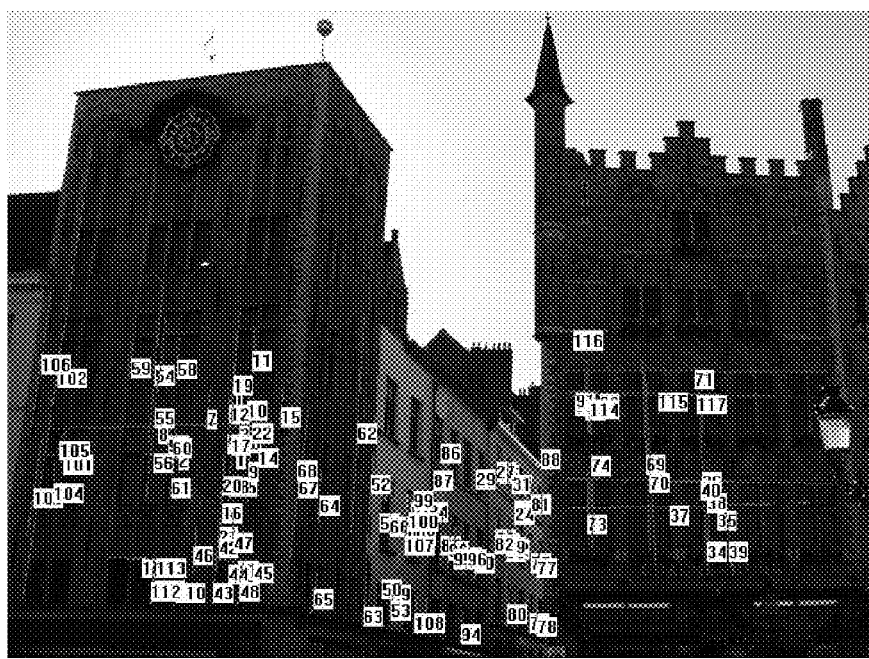
Figure 12A:
Figure 12B:
Figure 13A:
Figure 13B:

| | FIG. 7A-7B | FIG. 8A-8B | FIG. 9A-9B | FIG. 10A-10B | FIG. 11A-11B |
|---|---|---|---|---|---|
| SIFT | 2/5 | 2/7 | 9/13 | 1/2 | 40/45 |
| Harris-Aff. | 0/0 | 0/0 | 0/1 | 1/4 | 0/3 |
| MSER | 0/1 | 2/2 | 2/2 | 0/7 | 9/11 |
| Line Sig. | 11/11 | 53/53 | 76/76 | 50/50 | 110/118 |

Table 1 reports the number of correct matches over the number of detected matches. SIFT, Harris-affine and MSER find nearly no matches for the two image pairs shown in FIGS. 7A-7B and 8A-8B. Whereas the present line signature method detects many matches and substantially all of them are correct. It is worth noting that images in FIGS. 8A and 8B have large illumination change, so the conventional method (Bay et al. Wide-baseline stereo matching with line segments, CVPR, pages 329-336, 2005) and the conventional method (Schmid et al. Automatic line matching cross views, CVPR, 1997) also have difficulties with this image pair because they depend on color and intensity distribution.

FIGS. 9A-9B and 10A-10B are two pairs of non-planar scenes under large viewpoint changes. From Table 1, it can be noted that the present line signature method has much better performance on this set of images than the other local features. The image pair in FIGS. 10A-10B, in addition to the viewpoint change, has large non-uniform illumination variation.

FIGS. 11A-11B show the robustness of line signature method under extreme illumination changes.

FIGS. 12A-12B and FIGS. 13A-13B are two image pairs of planar scenes from Mikolajczyk's dataset (A comparison of affine region detectors. IJCV, 65(1): 43-72, 2005) in which the image deformation is a nomography. For FIG. 12A-12B, the line signature method according to an embodiment of the present invention detects 63 matches (all correct), which is better than SIFT (which obtains 0 correct matches over 11 detected matches) and Harris Affine (which obtains 8 correct matches over 10 detected matches). However, in this example for FIGS. 12A and 12B, the line signature method according to an embodiment of the present invention slightly under performs the MSER method as the MSER method obtains 98 correct matches over 98 detected matches. In the case FIGS. 13A-13B, the line signature approach according to an embodiment of the present invention detects 20 matches with 19 of the matches being correct matches. This demonstrates the robustness of the line signature method to large scale changes. However, in this extreme case where the image changes drastically the SIFT method may perform better than the present line signature method described herein.

Figure 14A:
FIGS. 14A-14E are an image sequence from the ZuBuD image database showing pictures of a same building taken at different view angles and at different distances from the building.
Figure 14B:
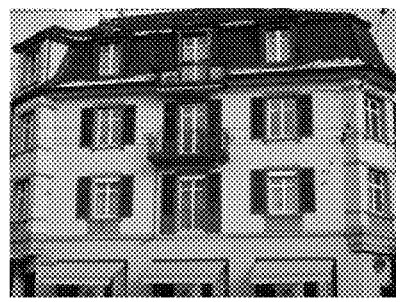
Figure 14C:
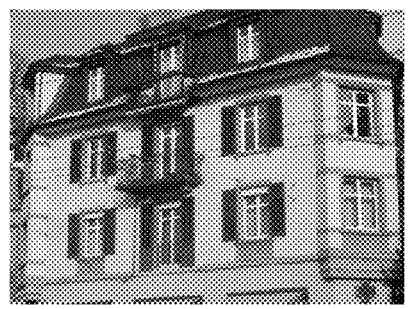
Figure 14D:
Figure 14E:
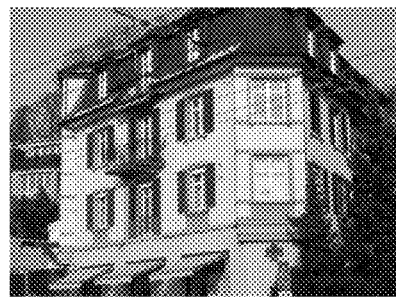

FIGS. 14A-14E are an image sequence from the Zurich Buildings Image Database (ZuBuD). The Images in FIGS. 14A-14E show pictures of a same building structure taken at different view angles and at different distances of the building. The first image in FIG. 14A is matched with each of the rest images in FIGS. 14B-14E.

Figure 15:
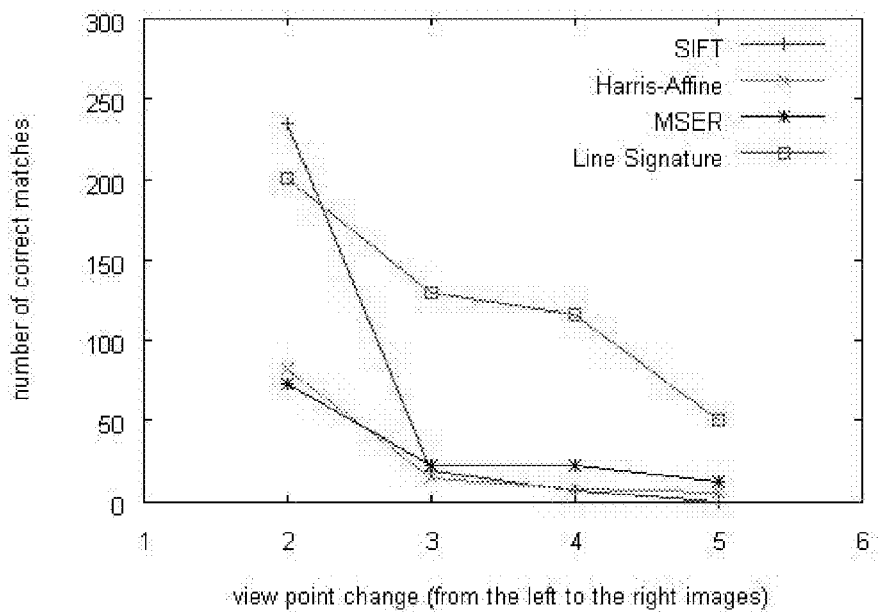
FIG. 15 is a plot of a number of correct matches of different features in the images shown in FIGS. 14A-14E versus increasing viewpoint angle obtained using various conventional methods and the method of base line matching according to an embodiment of the present invention.

FIG. 15 is a plot the number of correct matches of different features versus increasing viewpoint angle (from FIG. 14B to FIG. 14E). As shown in FIG. 15, for increasing viewpoint angle, the number of correct matches decreases for all types of signature methods (SIFT, Harris-Affine, MSER and Line Signature). However, the number of correct matches for line signature according to an embodiment of the present invention provides the least decrease of number of correct matches over the range of view point angle while providing and maintaining the highest number of correct matches in comparison with the other matching methods (SIFT, Harris-Affine, MSER). The SIFT method provides the highest correct of number of correct matches only for very small view point angle change (e.g., change from the view point in FIG. 14A to the view point in FIG. 14B). The number of correct matches using SIFT method declines drastically when the view point angle changes drastically (e.g., for example a change from the view point shown in FIG. 14A to the view point shown in FIG. 14E). FIGS. 14A-14E demonstrate that overall the line signature method according to an embodiment of the present invention has advantages in matching non-planar structured scenes under large 3D viewpoint changes.

Figure 16A:
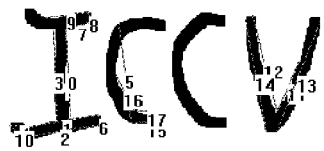
FIGS. 16A and 16B show two handwritings with clutters depicting the line segments matched with the wide baseline image matching method, according to an embodiment of the present invention.
Figure 16B:
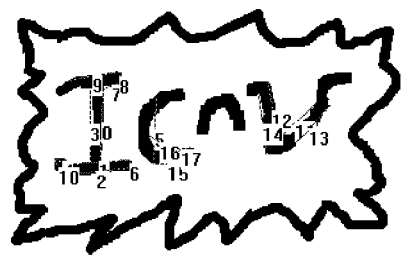

FIGS. 16A-16B shows two handwritings with clutters. The line signature approach detects 18 matches (all correct) while all the other methods mentioned above can hardly find any matches. This also demonstrates the advantage of making no hard assumption such as epipolar geometry or homographies.

The computation time using the line signature method described herein depends on the number of detected segments. In the current implementation, to match the image pair shown in FIGS. 5A-5B, it takes less than 2 seconds including line segment detection using a 2 GHz CPU. In average, it takes about 10 seconds to match images with 3000 segments such as FIGS. 9A-9B.

Extensive experiments validate that the line signature method according to an embodiment of the present invention described herein has better performance than conventional local features in matching relatively low-textured images, and non-planar structured scenes under large view point changes. The line signature method according to an embodiment of the present invention is robust to large scale changes and illumination variations, therefore it also has advantages over conventional wide-baseline line matching methods (e.g., Bay et al.'s method and Schmid et al.'s method).

In some embodiments, programs for performing methods in accordance with embodiments of the invention can be embodied as program products in a computer such as a personal computer or server or in a distributed computing environment comprising a plurality of computers. The computer may include, for example, a desktop computer, a laptop computer, a handheld computing device such as a PDA, etc. The computer program products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software products) embodied in a computer, the method described above can be implemented as hardware in which for example an application specific integrated circuit (ASIC) can be designed to implement the method or methods of the present invention.

Although the various steps of the method of image matching using line signature are described in the above paragraphs as occurring in a certain order, the present application is not bound by the order in which the various steps occur. In fact, in alternative embodiments, the various steps can be executed in an order different from the order described above.

Line signatures can be used in image matching (e.g., wide-baseline matching). Image matching has numerous applications including image-based 3D reconstruction. In image-based 3D reconstructions, models of objects can be computed from multiple 2D images. Image matching can also be applied in camera calibration and pose estimation which can be used in augmented reality. Line signatures can also be used in object detection, object recognition, object tracking, and image or video retrieval. Line signatures can also be used in photo organizing in which 3D spatial relationship between photos randomly taken by users can be automatically calculated. In this way, users can browse the photos in an order based on the calculated 3D spatial relationship rather than in a random order.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

It should be appreciated that in one embodiment, the drawings herein are drawn to scale (e.g., in correct proportion). However, it should also be appreciated that other proportions of parts may be employed in other embodiments.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed:

1. A method of transforming an image represented by an array of pixels having intensity values into a plurality of line signatures, the method comprising:
    deriving line segments from the intensity values of the pixels;
    designating a reference point for each of the plurality of line signatures;
    identifying a group of line segments from the derived line segments that are closest to the reference point; and
    generating the plurality of line signatures based on the identified group of line segments.

2. The method according to claim 1, wherein generating the plurality of line signatures comprises selecting line segments, from the identified group of line segments, each selected line segment having a saliency value greater than a threshold.

3. The method according to claim 2, wherein the saliency value of a line segment is a sum of a gradient magnitude of edge pixels of the line segment.

4. The method according to claim 1, wherein the reference point is an endpoint of a line segment in the plurality of line segments.

5. The method according to claim 1, further comprising extracting curves from the image and dividing the extracted curves into the plurality of line segments.

6. The method according to claim 5, further comprising merging a pair line segments in the plurality of line segments if a gap between the pair of line segments is smaller than a length of either line segment in the pair of line segments.

7. The method according to claim 1, further comprising determining a similarity between a first line signature in a first image and a second line signature in a second image.

8. The method according to claim 7, wherein determining the similarity between the first line signature and the second line signature comprises determining a similarity between corresponding pairs of line segments in the respective first and second line signatures.

9. The method according to claim 8, wherein the pair of line segments of the first line signature is described with a plurality of attributes, wherein the plurality of attributes include a distance between endpoints of the pair of line segments and an orientation from one endpoint to another endpoint of respective line segments in the pair of line segments.

10. A method of matching features in a pair of images using line signatures, the method being implemented using a computer system, the method comprising:
    determining, using the computer system, a first similarity measure between a first line signature in a first image in the pair of images and a second line signature in a second image in the pair of images;
    determining, using the computer system, a second similarity measure between the first line signature in the first image and a third line signature in the second image;
    comparing, using the computer system, the first similarity measure with a first threshold value; comparing a difference between the first similarity and the second similarity with a second threshold value; and
    if the first similarity measure is greater than the first threshold value and the difference between the first similarity and the second similarity is greater than the second threshold value, the first line signature and the second line signature produce a match.

11. The method according to claim 10, wherein the second line signature and the third line signature in the second image are top two most similar lines to the first line signature in the first image.

12. The method according to claim 10, wherein the first similarity measure and the second similarity measure are the highest similarity measures in a plurality of similarity measures determined between each line in a plurality of line signatures in the first image and each line signature in the plurality of line signatures in the second image.

13. The method according to claim 10, wherein the first line signature comprises a pair of line segments in the first image and the second line signature comprises a pair of line segments in the second image.

14. The method according to claim 13, wherein a relationship between the pair of line segments in the first image and the relationship between the pair of line segments in the second image are defined by the relationship between the lengths of the pair of line segments and the angles between the pair of line segments.

15. The method according to claim 13, wherein the pair of line segments of the first line signature is described with a plurality of attributes.

16. The method according to claim 15, wherein the plurality of attributes comprise a vector between endpoints of the pair of line segments, an angle between respective two lines connecting two endpoints of the pair of line segments, and a length ratio of distances between endpoints of the pair of line segments.

17. The method according to claim 13, wherein the pair of line segments of the second line signature is described with a plurality of attributes.

18. The method according to claim 13, wherein determining the first similarity measure between the first line signature in the first image and the second line signature in the second image comprises determining a similarity between corresponding line segments in the pair of line segments of the first line signature and the pair of line segments of line segments of the second line signature.

19. The method according to claim 13, wherein the first similarity measure between the first line signature and the second line signature is a sum of similarity values between corresponding line segment pairs in the first line signature and the second line signature.

20. The method according to claim 13, wherein a similarity type is assigned to the first similarity measure based at least in part on differences between ratios of line segment lengths.

21. The method according to claim 20, wherein the similarity type is an affine similarity, and the affine similarity is computed using at least the differences between ratios of lengths of corresponding line segments in the first line signature and the second line signature and using differences of angles between corresponding line segments in the first line signature and the second line signature.

22. The method according to claim 13, wherein the third line signature comprises a pair of line segments in the second image in the pair of images.

23. The method according to claim 22, wherein determining the second similarity measure between the first line signature in the first image and the third line signature in the second image comprises determining a similarity between corresponding line segments in the pair of line segments of the first line signature and the pair of line segments of line segments of the third line signature.

24. The method according to claim 14, wherein each line segment in the pair of line segments is associated with a saliency value.

25. The method according to claim 24, wherein the saliency value is a sum of a gradient magnitude of edge pixels of the associated line segment.

26. The method according to claim 24, wherein a saliency value s of a first line segment in the pair of line segments and a saliency value s' of a second line segment in the pair of line segments are related by s'≧r×s, where r is a ratio.

27. The method according to claim 26, wherein the ratio r is approximately equal to 0.5.

28. The method according to claim 10, wherein the first threshold is approximately 25 and the second threshold is approximately 5.

29. The method according to claim 10, further comprising sorting line signature correspondences according to a value of the difference between the first similarity measure and the second similarity measure.

30. The method according to claim 29, wherein the sorting comprises sorting line signature correspondences by descending value of the difference between the first similarity measure and the second similarity measure.

31. A computer program product comprising a non-transitory computer readable medium having instructions stored thereon when executed by a computer performs the method recited in claim 10.

32. A method of matching features in a pair of images using line signatures, the method being implemented using a computer system, the method comprising:
determining, using the computer system, a first best similarity measure and a second best similarity measure between a first line signature in a first image in the pair of images and a plurality of line signatures in a second image in the pair of images;
comparing, using the computer system, the first best similarity measure with a first threshold value;
comparing, using the computer system, the second best similarity measure with a second threshold value; and
determining, using the computer system, if the first similarity measure is greater than the first threshold value and the second best similarity measure is less than the second threshold value.

33. The method according to claim 32, wherein the first threshold value, the second threshold value or both are fixed.

34. The method according to claim 32, wherein the first threshold value, the second threshold value or both are variable.

35. The method according to claim 32, wherein if the first similarity measure is greater than the first threshold value and the second similarity is less than the second threshold value, the first line signature and a line signature in the plurality of lines signatures in the second image having the best similarity measure produce a match.

36. A system for matching features in a pair of images, comprising:
a computer processor configured to:
determine a first similarity measure between a first line signature in a first image in the pair of images and a second line signature in a second image in the pair of images;
determine a second similarity measure between the first line signature in the first image and a third line signature in the second image;
compare the first similarity measure with a first threshold value; and
compare a difference between the first similarity and the second similarity with a second threshold value; and
wherein, if the first similarity measure is greater than the first threshold value and the difference between the first similarity and the second similarity is greater than the second threshold value, the computer determines that the first line signature and the second line signature produce a match.

37. The system according to claim 36, wherein the first line signature comprises a pair of line segments in the first image and the second line signature comprises a pair of line segments in the second image.

38. The system according to claim 37, wherein the pair of line segments of the first line signature is described with a plurality of attributes.

39. The system according to claim 38, wherein the plurality of attributes include:

$r_1 = \vec{p_1c} \cdot \vec{p_1p_2} / |\vec{p_1p_2}|^2$, $r_2 = \vec{q_1c} \cdot \vec{q_1q_2} / |\vec{q_1q_2}|^2$, $l_1 = |q_1q_2|/|p_1p_2|$, $l_2 = |q_1p_1|/|p_1p_2|$, $l_3 = |q_1p_2|/|p_1p_2|$, $l_4 = |q_2p_1|/|p_1p_2|$, $l_5 = |q_2p_2|/|p_1p_2|$, $\theta_{1-5}$, and $g = g_2/g_1$, where $\vec{p_1p_2}$ is the first line segment and $\vec{q_1q_2}$ is the second line segment, $\vec{p_1c}$ is a vector between endpoint $p_1$ and intersection point c between first line segment $p_1p_2$ and second line segment $q_1q_2$, $\vec{q_1c}$ is a vector between endpoint $q_1$ and intersection point c between first line segment $p_1p_2$ and second line segment $q_1q_2$, $|p_1p_2|$ is the length of the first segment between endpoints $p_1$ and $p_2$, $|q_1q_2|$ is the length of the second segment between endpoints $q_1$ and $q_2$, $|q_1p_1|$ is the length between endpoints $q_1$ and $p_1$, $|q_1p_2|$ is the length between endpoints $q_1$ and $p_2$, $|q_2p_1|$ is the length between endpoints $q_2$ and $p_1$, $|q_2p_2|$ is the length between endpoints $q_2$ and $p_2$, $r_1$ and $r_2$ are length ratios, where $l_1$-$l_5$ represent the length ratios of distances between endpoints of the line segments $p_1p_2$ and $q_1q_2$, and $\theta_{1-5}$ represent angles between respective two lines connecting two endpoints of the line segments $p_1p_2$ and $q_1q_2$, and $g_1$ and $q_2$ are average gradient magnitude of the two line segments.

40. The system according to claim 39, wherein the pair of line segments of the second line signature is described with a plurality of attributes.

41. The system according to claim 40, wherein the plurality of attributes include:

$r'_1 = \overrightarrow{p'_1c'} \cdot \overrightarrow{p'_1p'_2}/|\overrightarrow{p'_1p'_2}|^2$, $r'_2 = \overrightarrow{q'_1c'} \cdot \overrightarrow{q'_1q'_2}/|\overrightarrow{q'_1q'_2}|^2$, $l'_1 = |q'_1q'_2|/|p'_1p'_2|$, $l'_2 = |q'_1p'_1|/|p'_1p'_2|$, $l'_3 = |q'_1p'_2|/|p'_1p'_2|$, $l'_4 = |q'_2p'_1|/|p'_1p'_2|$, $l'_5 = |q'_2p'_2|/|p'_1p'_2|$, $\theta'_{1-5}$, and $g' = g'_2/g'_1$, where $\overrightarrow{p'_1p'_2}$ is the first line segment and $\overrightarrow{q'_1q'_2}$ is the second line segment, $\overrightarrow{p'_1c'}$ is a vector between endpoint $p'_1$ and intersection point $c'$ between first line segment $p'_1p'_2$ and second line segment $\overrightarrow{q'_1q'_2}$, $\overrightarrow{q'_1c'}$ is a vector between endpoint $q'_1$ and intersection point $c'$ between first line segment $p'_1p'_2$ and second line segment $q'_1q'_2$, $|p'_1p'_2|$ is the length of the first segment between endpoints $p'_1$ and $p'_2$, $|q'_1q'_2|$ is the length of the second segment between endpoints $q'_1$ and $q'_2$, $|q'_1p'_1|$ is the length between endpoints $q'_1$ and $p'_1$, $|q'_1p'_2|$ is the length between endpoints $q'_1$ and $p'_2$, $|q'_2p'_1|$ is the length between endpoints $q'_2$ and $p'_1$, $|q'_1p'_2|$ is the length between endpoints $q'_2$ and $p'_2$, $r'_1$ and $r'_2$ are length ratios, where $l_1$-$l_5$ represent the length ratios of distances between endpoints of the line segments $p_1p_2$ and $q'_{1,2}$, and $\theta'_{1-5}$ represent angles between respective two lines connecting two endpoints of the line segments $p'_1p'_2$ and $q'_1q'_2$, and $g'_1$ and $g'_2$ are average gradient magnitude of the two line segments.

42. The system according to claim 41, wherein if a difference $|r_1-r'_1|$ and a difference $|r_2-r'_2|$ are smaller than a threshold Tr, the first similarity measure between the first segment pair and the second segment pair is an affine similarity Sa, otherwise the first similarity measure is a general similarity Sg.

43. The system according to claim 42, wherein the affine similarity Sa is computed using the following relationship:

$Sa = dr_1 + dr_2 + d\theta_1 + dl_1 + dg$, if $\Gamma$ = true, and $Sa = -\infty$, else where:

$dr_i = 1 - \frac{|r_i - r'_i|}{T_r}$, $i \in \{1, 2\}$;

$d\theta_1 = 1 - \frac{|\theta_1 - \theta'_1|}{T_\theta}$;

$dl_1 = 1 - \frac{\max(l_1, l'_1)/\min(l_1, l'_1) - 1}{T_l}$;

-continued $dg = 1 - \frac{\max(g, g')/\min(g, g') - 1}{T_g}$; and $\Gamma \equiv \{dr_i, d\theta_1, dl_1, dg\} \geq 0$ & $(\theta_1 - \pi)(\theta'_1 - \pi) \geq 0$ where $T_r$, $T_\theta$, $T_l$ and $T_g$ are thresholds.

44. The system according to claim 43, wherein if a change of any attribute is larger than a threshold, the similarity is $Sa=-\infty$.

45. The system according to claim 43, wherein $T_r$ is approximately equal to 0.3, $T_\theta$ is approximately equal to $\pi/2$, $T_l$ and $T_g$ are approximately equal to 3.

46. The system according to claim 42, wherein the general similarity is measured based on the relative positions between the 4 endpoints $p_1$, $p_2$, $q_1$ and $q_2$, using the following equations:

$Sg = \sum_{i=1}^{5} dl_i + \sum_{i=1}^{5} d\theta_i + dg$, if $\{dl_i, d\theta_i, dg\} \geq 0$ & $!C$ $Sg = -\infty$, else where $dl_i$, $d\theta_i$, and $dg$ are computed as follows:

$dl_i = 1 - \frac{\max(l_i, l'_i)/\min(l_i, l'_i) - 1}{T_l}$, $d\theta_i = 1 - \frac{|\theta_i - \theta'_i|}{T_\theta}$, and $dg = 1 - \frac{\max(g, g')/\min(g, g') - 1}{T_g}$.

47. The system according to claim 46, wherein an overall similarity measure S between two segment pairs is computed as follows:

$S = Sa$, if $|r_i - r'_i| \leq T_r$ $S = \frac{1}{4}S_g$, else.

48. A method of constructing line signatures in an image, the method being implemented using a computer system, the method comprising:
   extracting, using the computer system, curves from the image;
   dividing, using the computer system, the extracted curves into a plurality of straight line segments;
   merging, using the computer system, a pair of straight line segments in the plurality of straight line segments if a gap between the pair of straight line segments is smaller than a length of either line segment in the pair of straight line segments; and
   clustering, using the computer system, straight line segments in the plurality of straight line segments based on a spatial proximity and relative saliency between segments to define a line signature.

49. The method according to claim 48, wherein dividing the extracted curves into the plurality of straight line segment comprises applying a multi-scale scheme wherein each curve in the extracted curves is polygonized with a set of scales at different tolerance values.

50. The method according to claim 48, wherein clustering the straight line segments in the plurality of straight line segments comprises performing a search for each segment having a saliency value s for a top straight line segments that are closest and whose saliency value s' is greater than a product of the saliency s and a ratio r.

51. The method according to claim 50, wherein the saliency value of the line segment is a sum of a gradient magnitude of edge pixels of the associated line segment.

52. The method according to claim 48, further comprising determining a similarity between a first line signature in a first image and a second line signature in a second image.

53. The method according to claim 52, wherein determining the similarity between the first line signature and the second line signature comprises determining a similarity between corresponding pairs of line segments in the respective first and second line signatures.

54. The method according to claim 53, wherein the pair of line segments of the first line signature is described with a plurality of attributes.

55. The method according to claim 54, wherein the plurality of attributes include a distance between endpoints of the pair of line segments of the first line signature and an angle between two lines, each line connecting two endpoints of the pair of line segments.

56. The method according to claim 54, wherein a relationship between two of the endpoints is set as a reference and five other relative relationships between endpoints in the pair of line segments are described relative to the reference in terms of length ratios and relative angles.

57. The method according to claim 56, wherein an attribute of two line segments in the plurality of attributes includes a ratio of an average gradient magnitude of the line segments.

58. The method according to claim 53, wherein the pair of line segments of the second line signature is described with a plurality of attributes.

59. A computer program product comprising a non-transitory computer readable medium having instructions stored thereon when executed by a computer performs the method recited in claim 48.

60. A method for detecting correspondences between line segments in a 2D image and 3D line segments in a 3D model, comprising:
 projecting 3D line segments in the 3D model into a 2D image; and
 detecting correspondences between line segments of the 2D image and the projected 3D line segments using the method of claim 48.

61. A method of computing a similarity of two line segment pairs, the method being implemented using a computer system, the method comprising:
 classifying, using the computer system, the line segment pairs in an image into different types, wherein each line segment pair has one or more types;
 deforming, using the computer system, the image to obtain a deformed image;
 predicting, using the computer system, line segment pair types after deformation of the image;
 determining, using the computer system, if a type of the pair of line segments in the image matches one or more predicted types of the pair of line segments in the deformed image; and
 if no matching is found between the type of pair of line segments in the image and the pair of line segments in the deformed image, a similarity between of the pair of line segments in the image and the pair of line segments in the deformed image is $-\infty$, otherwise a similarity between the pair of line segments in the image and the pair of line segments in the deformed image is computed by describing the pair of line segments in the image and the pair of line segment in the deformed image with a plurality of attributes.

62. The method according to claim 61, wherein the plurality of attributes include a distance between endpoints of the pair of line segments and an orientation from one endpoint to another endpoint of respective line segments of the pair of line segments in the image.

63. The method according to claim 62, wherein the classifying comprises classifying the one of more pairs of line segments into different bins by quantizing a space of description vectors of line segment pairs into multiple subspaces.

* * * * *

UNITED STATES PATENT AND TRADEMARK OFFICE
CERTIFICATE OF CORRECTION

PATENT NO. : 8,406,532 B2  
APPLICATION NO. : 12/486506  
DATED : March 26, 2013  
INVENTOR(S) : Lu Wang et al.

Page 1 of 1

It is certified that error appears in the above-identified patent and that said Letters Patent is hereby corrected as shown below:

On title page, item (75) Inventors, Line 3
 replace "Aracida, CA"
 with --Arcadia, CA--.

Signed and Sealed this
Twenty-third Day of July, 2013

Teresa Stanek Rea
*Acting Director of the United States Patent and Trademark Office*